Figure 1:
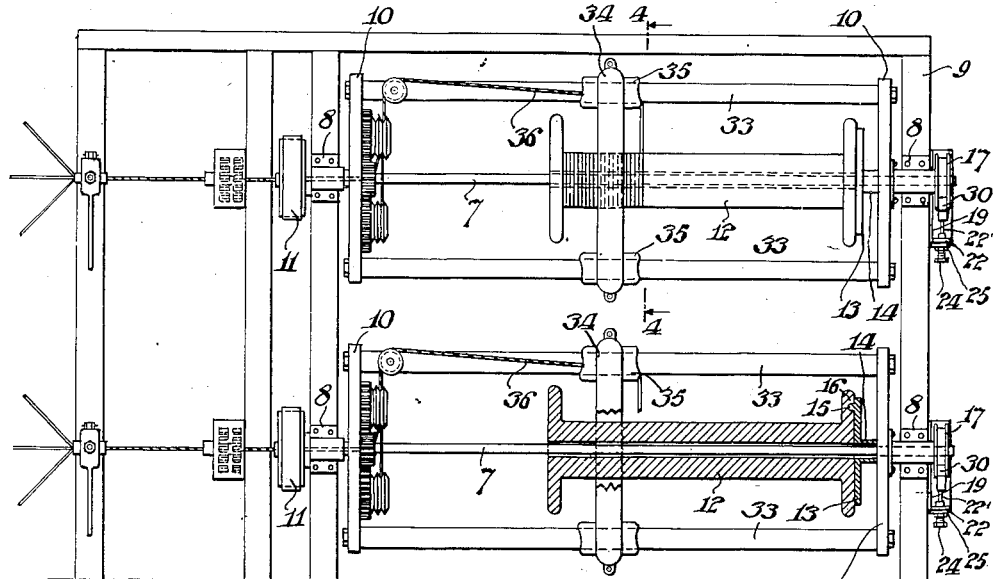

Jan. 8, 1935.  E. LEPO  1,987,344

BOBBIN CONTROL

Filed March 3, 1934

Inventor:
Enoch Lepo,
By
Attorney.

Patented Jan. 8, 1935

1,987,344

UNITED STATES PATENT OFFICE 1,987,344

BOBBIN CONTROL

Enoch Lepo, Philadelphia, Pa.

Application March 3, 1934, Serial No. 713,821

1 Claim. (Cl. 117—27)

This invention relates to bobbin control. The object is to provide improved adjustable means for securing the relative or differential rotative movements of the thread or cord guide and the spool or bobbin, in order to meet changing conditions occurring in the winding operation.

The invention comprises a rotating element disengageably connected to the spool or bobbin and adapted to rotate therewith, and an improved friction device, spring controlled and readily adjustable with respect to the frictional pressure exerted by said friction device upon the rotatable element.

Referring to the drawing, which illustrates merely by way of example suitable means for the embodiment of my invention:—

Figure 2:
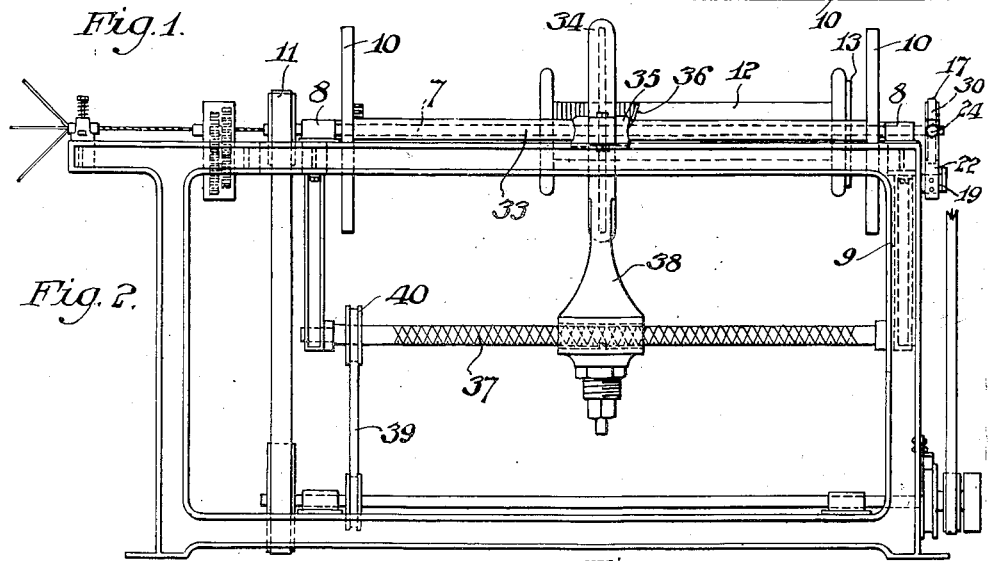
Figure 3:
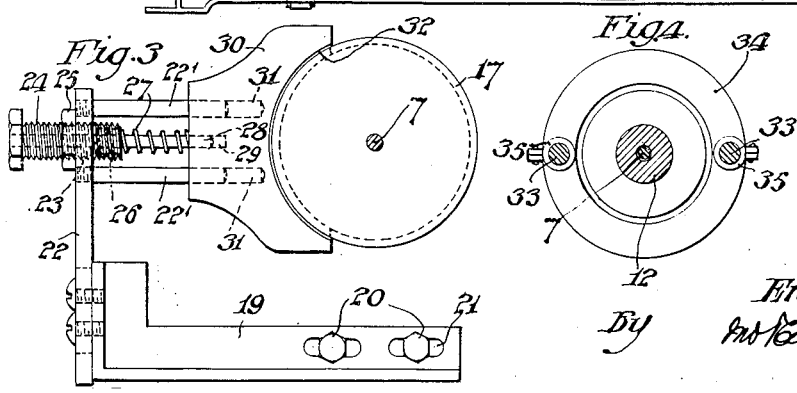
Figure 4:
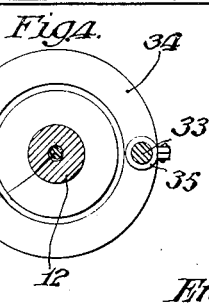

Fig. 1 is a plan view partly in section.
Fig. 2 is a side elevation.
Fig. 3 is a detail in elevation on an enlarged scale.
Fig. 4 is a section on line 4, 4 of Fig. 1.
Similar numerals refer to similar parts throughout the several views.

In these figures, 7 represents a shaft supported on the bearings 8 on the frame 9. On this shaft is mounted the reel 10 rotated by means of the pulley 11. Between the ends of reel 10, on the shaft 7 is loosely mounted the winding spool or bobbin 12. A disc 13 secured to one end of sleeve 14 is mounted on shaft 7 in one of the bearings 8 and is provided with a lug 15 disengageably engaging in socket 16 in the flange of spool 12. To the other end of sleeve 14 is secured a flanged wheel 17 which is outside the supporting frame 9. An angular bracket 19 is adjustably secured to the frame 9 by means of bolts 20 in the slots 21. A bar 22 is secured to the bracket 19 at right angles to its main extension and is provided at its outer or free end with two parallel pins or rods 22, and between said pins, with a threaded opening 23. A set screw 24 is threaded into opening 23 and a lock-nut 25 is provided for securing the set screw 24 in position of adjustment. The free end of set screw 24 is provided with a recess or socket 26 for receiving the end of spring 27, the other end of spring 27 abutting the brake shoe 30. A guide pin 28 passes through the set screw 24 and spring 27 into the hole or socket 29 of brake shoe 30. The two pins or rods 22 are adapted to reciprocate in channels 31 in said brake shoe 30. The brake shoe has a curved face and preferably a lining 32 of leather or the like for frictional engagement with the periphery of the flanged wheel 17. By the adjustment of the set screw 24 the tension of the spring 27 may be varied at will, and hence the effective pressure of frictional engagement of surface 32 with the periphery of wheel 17.

Upon the parallel bars 33 of the reel 10 is slidably mounted the flyer ring 34 carrying the guides 35 for the strand or cord 36 which is to be wound upon the spool 12. This flyer or ring 34 with guides 35 is adapted to be reciprocated upon the bars 33 by means of the reversing screw 37 cooperating with shoe 38 having a formation engaging the thread of said screw. The screw 37 is rotated by means of belt 39 and pulley 40. As this method of reciprocating the thread guides is common practice, no further description of the same is thought to be necessary.

In operation:

When the thread or cord 36 is fastened to the spool 12 and the guides 35 rotate with the reel 10 and ring 34, the spool would normally rotate with a guide. The only way to cause the winding of the cord upon the spool by the rotation of a guide, is to secure a differential rotation of the spool with respect to the ring 34 and guides 35. This is secured by retarding the rotation of the spool with respect to its normal rotation due to the tension of the cord passing through a guide 35. This retarding is secured by means of the brake shoe 30 acting upon wheel 17 of the retarder, and the tension or pressure exerted thereon by the spring 27. As this spring tension may be varied at will by the set screw 14, and the required tension maintained by the lock nut 25, it follows that any desired differential may be secured and changed from time to time to meet any requirements arising, for example, from the weight and tension of the cord.

What I claim is:—

In a braking device for the bobbin of a cord winding machine, the combination with the frame of the machine, of a flanged angle-iron bracket with elongated slots for adjustable securing to the frame, a straight flat bar with elongated slots for adjustable securing to the bracket, a pair of parallel rods secured in said bar in spaced relationship, said bar provided with a threaded channel extending therethrough between the parallel rods, a channeled-screw, threaded through said bar, a guide-rod extending through the channeled-screw, a brake shoe member having a frictional engaging surface in one face, and a plurality of channel openings in the opposite face for receiving the ends of said parallel rods and the guide-rod, and a spring surrounding the guide-rod abutting the brake shoe at one end and the channeled screw at the other end.

ENOCH LEPO.